United States Patent [19]

Nielsen, Jr. et al.

[11] 4,414,829
[45] Nov. 15, 1983

[54] LOCKING DEVICE FOR AN ELECTRIC METER BOX

[75] Inventors: Anker J. Nielsen, Jr., Holden; Richard E. Hoyt, Worcester, both of Mass.

[73] Assignee: Nissan Motor Co., Ltd., Yokohama, Japan

[21] Appl. No.: 223,570

[22] Filed: Jan. 9, 1981

[51] Int. Cl.³ .................. B65D 55/14; E05B 65/52; E05C 5/04; E05C 13/02
[52] U.S. Cl. ............................... 70/160; 70/63; 70/77; 70/232; 70/371; 70/DIG. 34; 70/DIG. 57; 292/251; 292/327; 292/DIG. 11
[58] Field of Search .............. 70/DIG. 34, 161, 160, 70/159, 163, 164, 166–168, 170–172, 371, 77, 63, 230, 232, 140, DIG. 57; 292/251, DIG. 11, 281–286, 301; 220/327

[56] References Cited

U.S. PATENT DOCUMENTS

| | | | |
|---|---|---|---|
| Re. 28,187 | 10/1971 | Longenecker | 70/166 X |
| 478,754 | 7/1892 | Marshall et al. | 292/251 X |
| 864,363 | 8/1907 | Fisher | 292/251 |
| 999,891 | 8/1911 | Shepard | 292/251 |
| 1,017,135 | 2/1912 | Chaffee | 292/281 |
| 2,077,626 | 4/1937 | Hull | 292/251 X |
| 2,458,046 | 1/1949 | Audet | 70/77 |
| 2,723,794 | 11/1955 | Russell | 292/251 X |
| 3,157,040 | 11/1964 | Raye | 70/63 X |
| 3,564,879 | 2/1971 | Bennett | 70/232 |
| 3,782,146 | 1/1974 | Franke | 70/166 X |
| 3,784,727 | 1/1974 | Haubein | 70/DIG. 57 X |
| 3,789,635 | 2/1974 | Van Brunt et al. | 70/232 |
| 4,055,973 | 11/1977 | Best | 70/371 X |
| 4,065,946 | 1/1978 | Loynes et al. | 70/DIG. 57 X |
| 4,120,182 | 10/1978 | Michelman et al. | 70/77 X |
| 4,144,729 | 3/1979 | Nielsen | 70/232 X |
| 4,254,647 | 3/1981 | Finck | 70/77 |

FOREIGN PATENT DOCUMENTS

| | | | |
|---|---|---|---|
| 184942 | 8/1922 | United Kingdom | 292/251 |
| 1345966 | 2/1974 | United Kingdom | 292/251 |

OTHER PUBLICATIONS

"Stop It Now With the Calmart Watt Lock ®", Cat. No. CWL 976, 4 pp.; Calmart Co., Inc., P.O. Box 694, Tulsa, OK.

Primary Examiner—Cornelius J. Husar
Assistant Examiner—Carl F. Pietruszka
Attorney, Agent, or Firm—Thompson, Birch, Gauthier & Samuels

[57] ABSTRACT

A device for locking a rectangular electric meter box having an openable front cover. The device has an L-shaped lock housing which includes a first leg fixed to the front cover of the box and a second leg which is detachably fastened to the side wall of the box when the front cover is closed. A barrel lock is inserted into the second leg of the lock housing to block unauthorized removal of the detachable fastener from the side wall of the meter box.

1 Claim, 6 Drawing Figures

U.S. Patent   Nov. 15, 1983   Sheet 1 of 2   4,414,829
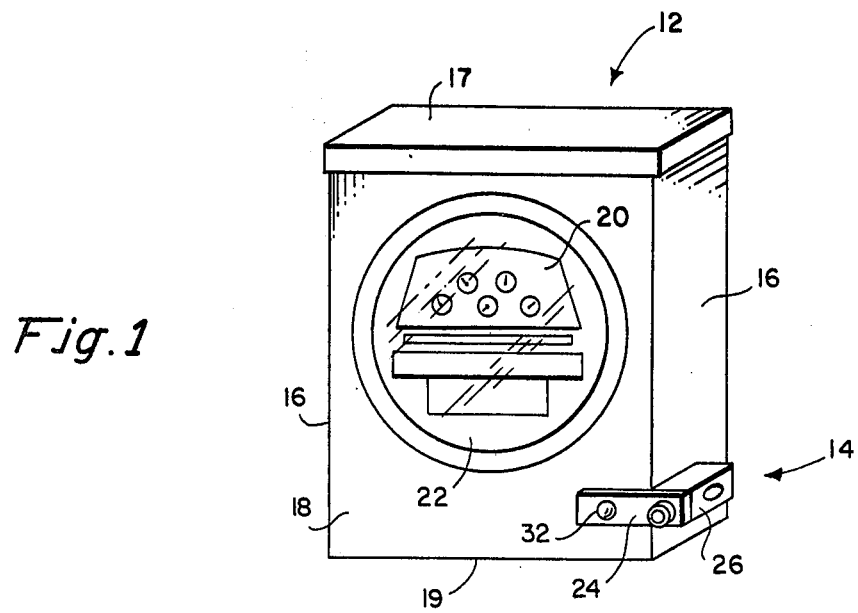
Fig.1
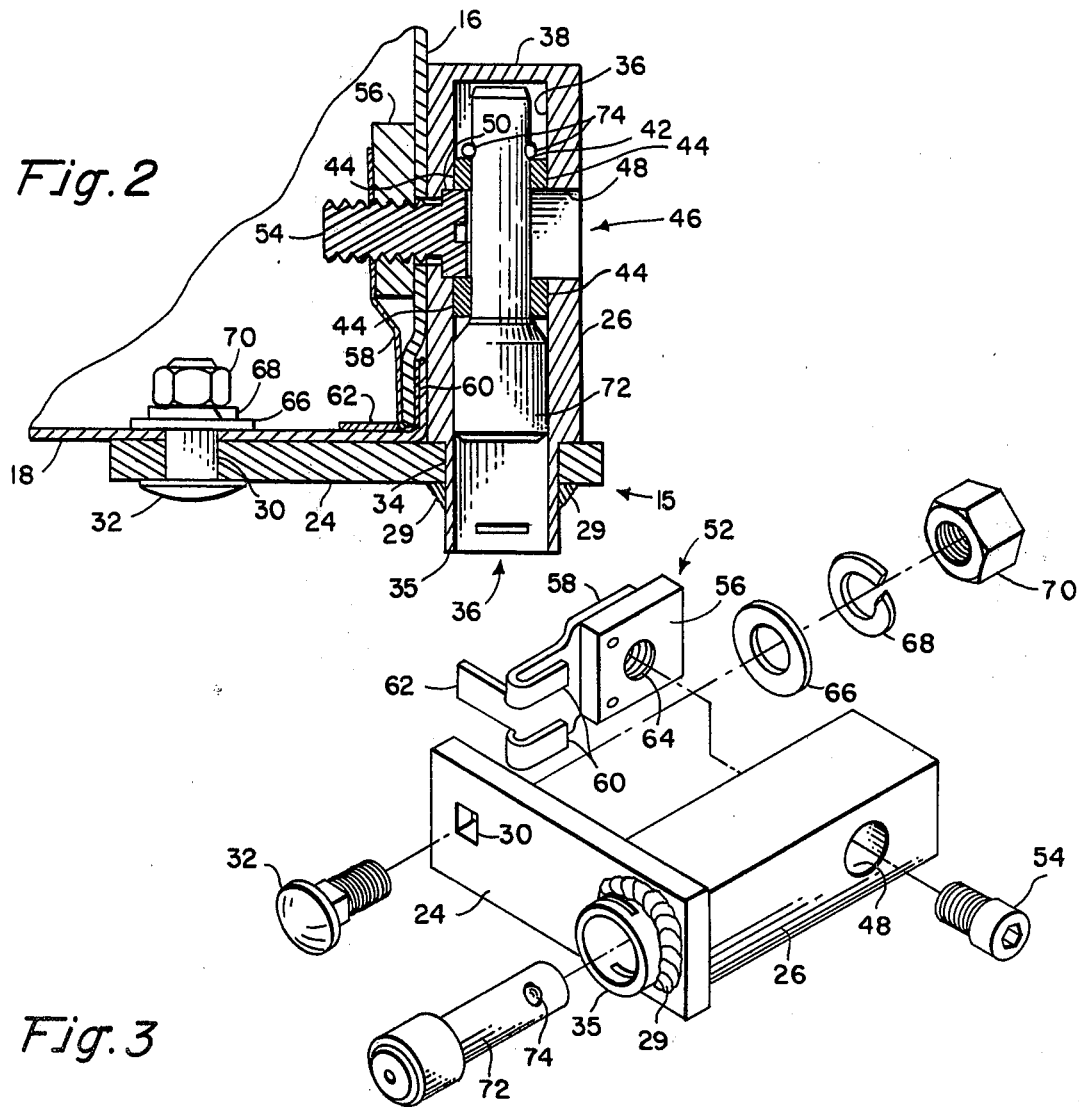
Fig.2
Fig.3

LOCKING DEVICE FOR AN ELECTRIC METER BOX

BACKGROUND OF THE INVENTION

1. Field of the Invention

The present invention relates to locks and, more particularly, is directed toward locks for electric meter boxes.

2. Description of the Prior Art

Various locking devices have been designed to prevent unauthorized access to the interior of electric meter boxes in order to prevent tampering with the operation of the meter contained therein. Generally, access to the interior of electric meter boxes is gained by removing a frangible seal and upwardly pivoting a cover which is hinged to the body of the box. U.S. Pat. No. 4,144,729 discloses an electric meter box having a bracket which is bolted to the side wall of the meter box. A separate L-shaped cover lock has a captivated axially extending bolt. One leg of the cover lock is positioned to block the closed front cover and the other leg is telescopically inserted into the side wall bracket. The captivated bolt is turned snug to fix the leg in the bracket, and a barrel lock of the well known bolt-type is inserted in the leg behind the captivated bolt to block its unauthorized removal. This prior art device has proven less than fully satisfactory especially when used to secure aluminum boxes because such boxes can be pried open despite the presence of the lock.

SUMMARY OF THE INVENTION

It is the object of the present invention to provide an electric meter box lock which does not have the previously mentioned disadvantage.

Another object of the present invention is to provide an electric meter box lock which will securely lock boxes that are made of various materials.

The lock of the present invention has an L-shaped lock housing having a first leg bolted to the front cover of the meter box. This bolting is accomplished by use of a smooth-headed bolt that can't be removed from the front of the box. The L-shaped housing has a perpendicular second leg which is positioned flush against a side wall of the box when the front cover is closed. The second leg has an axial bore and a transverse bore which intersect.

A bolt-type fastener is inserted into the second leg's tranverse bore to detachably fasten the lock housing to the box which has a nut-like element on the inside of the side wall. A barrel lock is inserted into the axial bore of the second leg to block unauthorized removal of the bolt fastener.

BRIEF DESCRIPTION OF THE DRAWINGS

FIG. 1 is a perspective view of an electric meter box secured by a lock embodying the present invention;

FIG. 2 is a top plan cross-sectional view of the lock of FIG. 1;

FIG. 3 is an exploded view of the lock of FIG. 2;

DESCRIPTION OF THE PREFERRED EMBODIMENT

Figure 4:
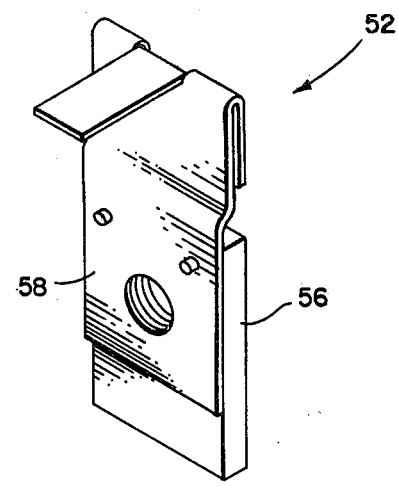
FIG. 4 is a perspective view of the back plate of FIG. 3 shown from its other side.

Referring now to the drawings, particularly FIG. 1, there is shown an electric meter box 12 having a lock 14 mounted thereto. Meter box 12 includes two side walls 16, a top wall 17, a bottom wall 19, and a back wall which are all fastened together. A front cover 18 is hinged to the top wall 17. Box 12 houses a meter 20 with dials for recording the usage of electricity. The dials are visible through a glass bowl 22 that projects outwardly through an aperture in front cover 18. Front cover 18 can be securely locked closed to prevent unauthorized access to meter 20, and can be quickly unlocked and opened by the use of a special key to provide authorized access to proper personnel.

Referring now to FIGS. 2 and 3, it will be seen that lock 14 comprises lock housing 15 having a substantially L-shaped profile in top plan cross-section and includes a first leg 24 and a perpendicular second leg 26. Near the free end of first leg 24, a square aperture 30 is formed. Square aperture 30 is adapted to accept and non-rotatively hold a smooth-headed carriage bolt 32. Bolt 32 securely affixes first leg 24 to front cover 18 (see FIG. 2). Bolt 32 has a smooth head which prevents its being unbolted from the front side of front cover 18. The other end of first leg 24 has a round aperture 32 that snugly receives the tubular front end 35 of second leg 26. Front end 35 of second leg 26 is permanently affixed to aperture 34 of first leg 24 by a circular weld 29.

Second leg 26 has a longitudinally extending axial bore 36. The front end 35 of bore 36 is open and the rear end 38 of bore 36 is closed. A hollow cylindrical bushing 44 having a knurled exterior surface is inserted into the front end 35 and is press-fitted into axial bore 36 as shown in FIG. 2. The apertured circular end surface of bushing 44 which faces the closed rear end 38 of axial bore 36 forms a annular locking shoulder 42 for purposes to be hereafter described. A transverse bore 46 is formed through second leg 26, as shown in FIG. 2, and has a large diameter opening 48 and a countersunk opening 50. Transverse bore 46 passes through bushing 44 and intersects axial bore 36. This completes the description of lock housing 15.

In order to fasten lock housing 15 to side wall 16 of meter box 12, a back plate 52 and a cap screw 54 are used. Back plate 52 has a thick block 56 and a thin strip 58 of sheet metal which is formed and bent into a specific shape, as shown in FIG. 4. Strip 58 is riveted to block 56, has two gripping fingers 60 to resiliently grip the front edge of side wall 16, and has an alignment finger 62 positioned to be contacted by first cover 18 when it is closed. Block 56 is provided with a threaded hole 64 which will mate with cap screw 54. The cap screw 54 preferably has a countersunk portion in its head which permits it to be turned by an Allen wrench.

Lock housing 15 remains bolted to front cover 18 at all times by means of carriage bolt 32. The head of carriage bolt 32 seats in square hole 30 in first leg 24, and the shank of the bolt extends through a precisely located hole in front cover 18, and then through flat washer 66, lock washer 68 and nut 70. The lock housing 15 is detachably bolted to side wall 16 at selected times by means of cap screw 54 which is inserted through transverse bore 46. The head of cap screw 54 seats in countersunk opening 50 in second leg 26, and the shank of the screw extends through a precisely located hole in side wall 16, and then through threaded hole 64 in thick block 56. An Allen wrench is inserted through transverse bore 46 to tighten cap screw 54 to securely fasten front cover 18 to side wall 16 to close meter box 12.

In order to prevent unauthorized persons from using an Allen wrench to open the meter box 12, a conventional bolt-type barrel lock 72 is used. Such barrel locks (and their special keys) are completely described in U.S. Pat. Nos. 1,923,035 and 3,174,802. The axial bore through bushing 44 has a sufficiently large diameter to precisely permit a barrel lock 72 to pass therethrough when the lock has its locking balls 74 in the retracted (unlocked) position. The axial bore through bushing 44 likewise has a sufficiently small diameter to prevent the barrel lock 72 from being withdrawn when the lock has its locking balls 74 in the extended (locked) position against annular locking shoulder 42, as shown in FIG. 2.

The operation of the preferred embodiment will now be discussed in detail. Before installing lock 14 on meter box 12, two holes must be punched or drilled in precise locations on box 12. One hole must be punched in front cover 18 and a second hole must be punched in side wall 16. A template or similar hole locating means is usually provided to the installer. Alternatively, the second hole could be punched in the bottom wall, but the side wall location is preferred.

The first leg 24 of the lock housing 15 is then fixed to the front cover by use of carriage bolt 32, flat washer 66, lock washer 68, and nut. Because of the square hole 30 and the smooth head of bolt 32, once nut 70 has been tightened, first leg 24 is securely affixed to front cover 18 and cannot be detached when cover 18 is closed.

Back plate 52 is clipped onto the front edge of side wall 16. The two fingers 60 resiliently grip side wall 16, and threaded hole 64 in thick block 56 is aligned with the punched hole in side wall 16.

It will now be seen that front cover 18, which is hinged to top wall 17, can be pivoted open and closed. In the open position, lock housing 15 remains entirely with front cover 18, and is swung away from side wall 16. In the closed position, cover 18 presses alignment finger 62 of back plate 52 into correct alignment (thereby correctly aligning back plate 52). Second leg 26 becomes positioned against side wall 16 so that transverse bore 46, the side wall punched aperture, and threaded hole 64 are in axial alignment. The cap screw 54 is inserted through opening 48 and is screwed tight into threaded hole 64 by means of an Allen wrench. This fastens the front cover 18 tightly to side wall 16 and tightly closes box 12. However, the box is not locked.

To lock the box, a barrel lock 72 is inserted into axial bore 36 of second leg 26. By use of a special key, the locking balls are retracted, the barrel lock is pushed through bushing 44, and the locking balls are extended (i.e. the barrel lock is locked). The locked barrel lock now cannot be removed from axial bore 36 because the extended locking balls 74 bear against annular locking shoulder 42 on the bushing 44. The barrel lock extends across and prevents the cap screw from being removed from intersecting transverse bore 46. The meter box 12 is now firmly closed and securely locked.

An authorized person can open meter box 12 only by using the special barrel lock key to unlock and remove the barrel lock, and then an Allen wrench can be used to unscrew and remove the cap screw. The front cover can then be opened and the meter box entered.

DESCRIPTION OF THE ALTERNATIVE EMBODIMENT

Figure 5:
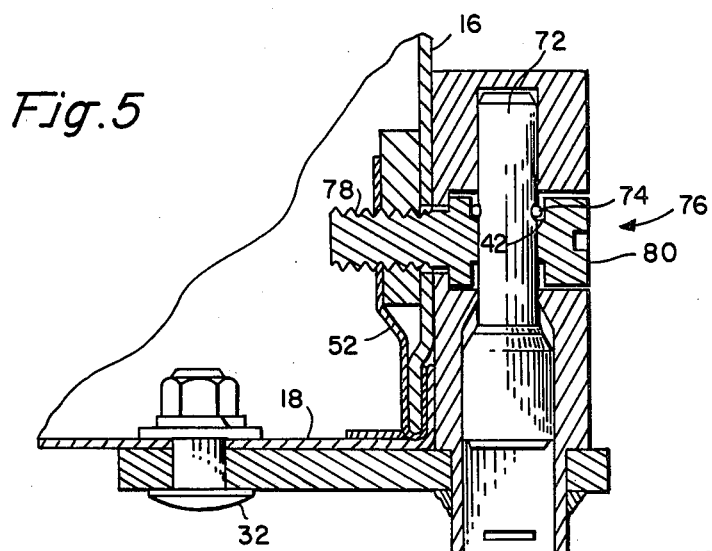
FIG. 5 is a top plan cross-sectional view of an alternate embodiment of the lock of FIG. 2.
Figure 6:
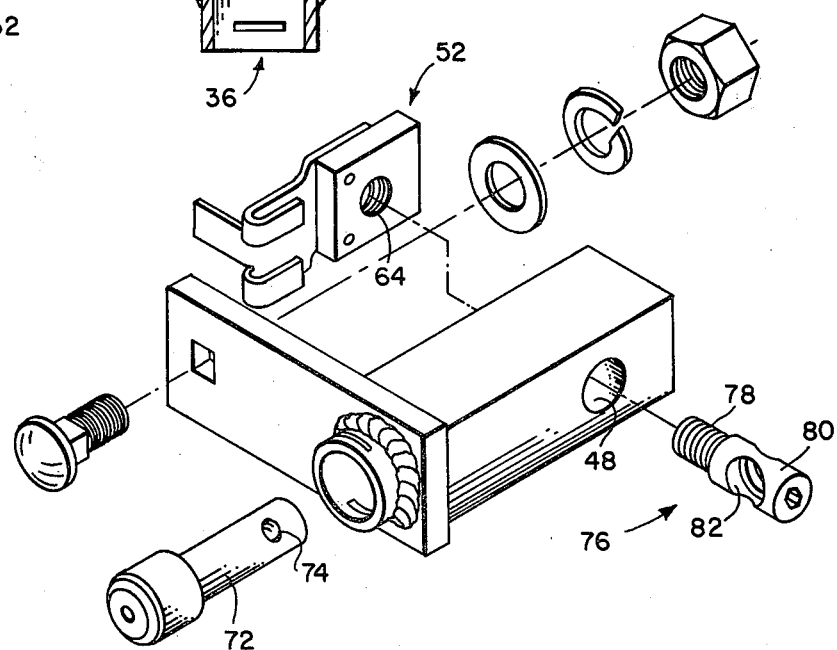
FIG. 6 is an exploded view of the lock of FIG. 5.

The alternative embodiment of lock 14 is shown in FIGS. 5-6. The alternative embodiment is identical to the preferred embodiment (shown in FIGS. 2-3) except that the short cap screw 54 has been replaced by a longer cap screw 76, and bushing 44 has been omitted. The longer cap screw 76 has a threaded shank 78 and a longer head 80 which is countersunk to be turned by an Allen wrench. Head 80 has a transverse countersunk aperture 82 which is sized to permit barrel lock 72 to pass transversely through cap screw 76, as shown in FIG. 5. When the barrel lock 72 is locked, locking balls 74 are extended and are retained by the countersunk portion 42 which functions as the annular locking shoulder. When the barrel lock 72 is unlocked, locking balls 74 are retracted and the barrel lock can be withdrawn from axial bore 36.

The operation of the alternate embodiment will now be described. The lock housing 15 is permanently fixed to the front cover by bolt 32. The back plate 52 is clipped onto the front edge of side wall 16. Front cover 18 is closed and cap screw 76 is inserted through opening 48 and is screwed tight into threaded hole 64 by means of an Allen wrench. This fastens front cover 18 tightly to side wall 16 to close box 12.

To lock the meter box 12, barrel lock 72 is inserted into axial bore 36. By use of a special key, the barrel lock is first unlocked (retracting locking balls 74) and pushed through cap screw aperture 82. Then, the barrel lock is locked (extending locking balls 74) so that the locking balls bear against and are retained by annular locking shoulder 42 (the countersunk portion of aperture 82). When the barrel lock is thus locked, it cannot be removed from axial bore 36 except by use of the special key, and cap screw 76 cannot be removed from transverse bore 46 because it is pinned by the barrel lock which passes through its aperture 82. The meter box is now firmly closed and locked.

To unlock and open the meter box, the special key is used to unlock and withdraw barrel lock 72 from axial bore 36. Then, an Allen wrench is used to unscrew and withdraw cap screw 76 from transverse bore 46. The front cover can then be opened and the meter box entered.

The above description obviously suggests many possible variations and modifications of this invention which would not depart from its spirit and scope. It should be understood, therefore, that the invention is not limited in its application to the details of structure specifically described or illustrated and that, within the scope of the appended claims, it may be practiced otherwise than as specifically described or illustrated.

We claim:
1. A locking device for an electric meter box comprising:
  (a) an L-shaped lock housing having a first leg adapted to be securely fixed to the hinged front cover of the meter box, and having a second leg extending substantially perpendicular to said first leg and adapted to be positioned flush against and detachably fastened directly to a side wall of the meter box to lock the front cover in the closed position;
  (b) said second leg having an axial bore opening only at the front end of said second leg, said second leg also having a transverse bore intersecting said axial bore, said transverse bore opening at both sides of said second leg;

(c) fastener means inserted into said second leg transverse bore for detachably fastening said second leg directly to the meter box side wall;

(d) said second leg being sized and shaped to accommodate the insertion of a bolt-type lock into said second leg axial bore, said bolt-type lock having a barrel, a plunger and locking balls, said bolt-type lock, when in its locked position with its locking balls extended, being fixed against withdrawal from said axial bore and fixing said fastener means against withdrawal from said transverse bore, said bolt-type lock, when in its unlocked position with its locking balls retracted, being removable from said axial bore and permitting said fastener means to be removed from said transverse bore;

(e) said inserted fastener means having a head portion which, when said bolt-type lock is inserted into said second leg axial bore is completely blocked by said bolt-type lock from exterior access;

(f) said second leg axial bore having a reduced diameter portion spaced from its closed end, said reduced diameter portion being sized and located to engage the extended locking balls of said bolt-type lock to fix and bolt-type lock in said second leg axial bore to block said inserted fastener means; and (g) bushing means forming said reduced diameter portion, said bushing means fitted and fixed in said second leg axial bore, said bushing means defining part of said second leg transverse bore, said bushing means retained in said second leg axial bore by said fastener means.

* * * * *

UNITED STATES PATENT AND TRADEMARK OFFICE
CERTIFICATE OF CORRECTION

PATENT NO. : 4,414,829
DATED : November 15, 1983
INVENTOR(S) : Anker J. Nielsen, Jr. and Richard E. Hoyt It is certified that error appears in the above-identified patent and that said Letters Patent are hereby corrected as shown below:

Cancel "[73] Assignee: Nissan Motor Co., Ltd., Yokohama, Japan" and insert --[73] Assignee: Omco Inc., Holden, Massachusetts.--

Signed and Sealed this

Thirteenth Day of March 1984

[SEAL]

Attest:

GERALD J. MOSSINGHOFF

Attesting Officer

Commissioner of Patents and Trademarks